No. 719,430. PATENTED FEB. 3, 1903.
L. C. BULKLEY.
APPARATUS FOR HUMIDIFYING THE ATMOSPHERE.
APPLICATION FILED FEB. 11, 1901.
NO MODEL.
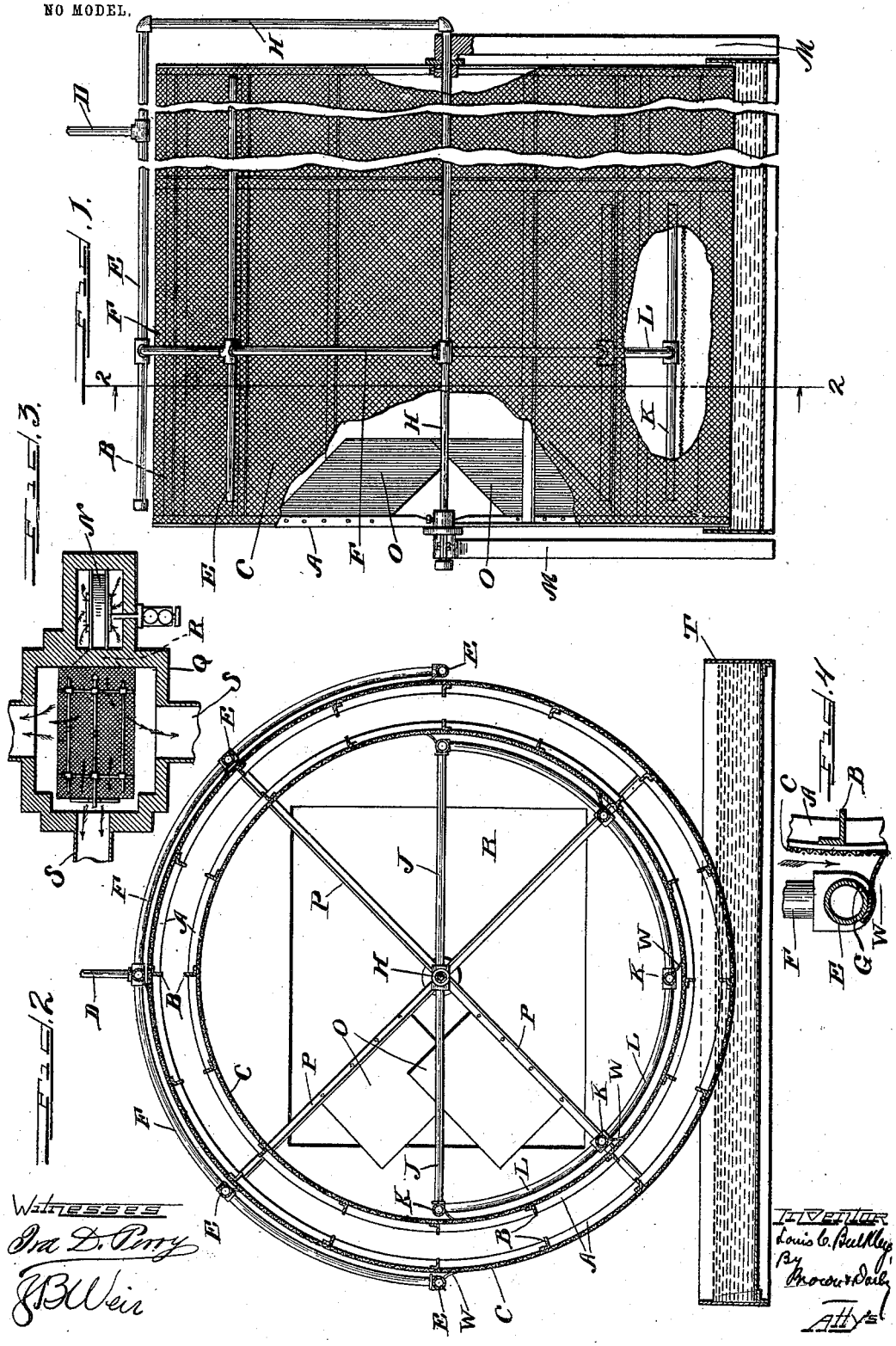

UNITED STATES PATENT OFFICE.

LOUIS CARLETON BULKLEY, OF HILLSIDE, MISSOURI.

APPARATUS FOR HUMIDIFYING THE ATMOSPHERE.

SPECIFICATION forming part of Letters Patent No. 719,430, dated February 3, 1903.

Application filed February 11, 1901. Serial No. 46,773. (No model.)

*To all whom it may concern:*

Be it known that I, LOUIS CARLETON BULKLEY, a citizen of the United States, residing at Hillside, in the county of St. Louis and State of Missouri, have invented a new and useful Apparatus for Humidifying the Atmosphere, of which the following is a specification.

This invention relates to apparatus for humidifying the atmosphere.

The object of the invention is to provide a construction and arrangement of apparatus which is simple, economical, and efficient, whereby the degree of moisture or humidity in the atmosphere may be varied or controlled, increased or diminished, as desired.

The invention consists, substantially, in the construction, combination, location, and arrangement, all as will be more fully hereinafter set forth, as shown in the accompanying drawings, and finally pointed out in the appended claims.

Referring to the accompanying drawings, and to the various views and reference-signs appearing thereon, Figure 1 is a view in side elevation, parts being broken out, of an apparatus constructed in accordance with the principles of my invention. Fig. 2 is a section on the line 2 2, Fig. 1, looking in the direction of the arrows. Fig. 3 is a sectional plan view, parts broken off and on a reduced scale. Fig. 4 is a broken detail view in transverse section.

The same part is designated by the same reference-sign wherever it occurs throughout the several views.

In some lines of manufacture—in auditoriums, hospitals, conservatories, hothouses, dwellings, and the like—it is desirable to provide means whereby the degree of moisture in the air may be varied or regulated. This is particularly true where the rooms or buildings in which such regulation is desired are heated by blower systems, direct radiators, or registers.

It is the special purpose of my invention to provide an apparatus which is of simple construction and efficient in operation, whereby the desired regulation of the humidity or moisture in the atmosphere may be regulated, varied, increased, diminished, or controlled, as desired, and in carrying out my invention I propose to saturate or keep dampened or moist a suitable surface and to deliver air upon such moist or dampened surface, so as to increase or decrease, as occasion requires, the percentage of humidity or moisure contained in the air to suit the exigencies of use.

The best form of apparatus in which I have embodied or contemplated carrying my invention into practical effect comprises a suitable frame, which may be of any convenient or desired construction, but which on account of its simplicity of construction and arrangement and lightness may be made up of suitable angle-irons A B, upon which frame is mounted a network C. I have found in practice that the best results are obtainable when two frames provided with the network or screen, as above described, are employed, one arranged as a skeleton within the other, as clearly shown in the drawings. Upon the network or screening of the skeleton frames water is delivered in any suitable manner. I have shown a convenient arrangement wherein a supply-pipe D is employed and which communicates with any suitable source of supply. Communicating with supply-pipe D are a series of discharge-pipes E, suitably spaced apart and in communication with each other and supply-pipe D in any convenient manner, as by means of the connecting pipes or sections F. The delivery-pipes E are arranged to extend in close proximity to the saturated surface or network C of the outer frame and are perforated, as indicated at G, Fig. 4, whereby the water is delivered from said supply-pipes E to the surface C. The water may be delivered to the network or surface C of the inner frame in any suitable or convenient manner—as, for instance, by means of a pipe H, communicating with the supply-pipe D, and from which pipe H may lead suitable branches J to similar delivery-pipes K and connecting-sections L, the delivery-pipes K being arranged in close relation with respect to the inner surface C to be saturated, dampened, or moistened and being provided with perforations similar to the perforations G in delivery-pipes E. In this manner the surfaces to be saturated may be supplied with water in any suitable or desirable quantity, according to the necessities or requirements.

I have found that the best results are obtainable when a relative movement is imparted to the surface to be saturated and the delivery-pipes E and K in order to effect a proper distribution of the water over the said surfaces C. This result may be accomplished in many different ways. In the form shown the skeleton frames upon which the surfaces C are supported are rigidly connected together and are mounted to rotate or revolve, while the system of supply and delivery pipes and connecting branches are held stationary. I do not desire, however, to be limited in this respect to the particular construction shown. Where the frames which support the surfaces C are mounted to revolve, said frame may be cylindrical in shape and suitably journaled in bearings formed in standards or brackets M, and a convenient arrangement of the supply-pipe H for the delivery-pipes K of the inner surface V is to arrange said pipe H to extend through the bearing for the cylindrical skeleton frames and axially with reference to such frames, thus constituting a hollow shaft upon which the frames revolve. Ball-bearings or other suitable bearings may be employed for the revolving frames. The relative movement of the surfaces to be saturated and the delivery-pipes may be effected from any suitable source of power and in any convenient manner. Where a rotary construction is used, such as is shown in the drawings and above described, the desired rotation may be imparted to the frames by means of an air-blast delivered from a rotary fan or blower (indicated at N, Fig. 3) upon suitable fan-blades O in a well-known manner, said fan-blades being carried by the cross-bars P, forming part of the skeleton framework of the apparatus. If desired, the apparatus may be inclosed within a casing Q, an opening (indicated at R, Fig. 2, and in dotted lines R, Fig. 3) being provided in said casing for the air-blast to be delivered into the interior of the rotary frame. The air thus delivered may be drawn from the outer atmosphere or from the atmosphere within the room or inclosure in which the desired moisture regulation is to be effected, and by delivering such air through the frame and upon or through the saturated surfaces thereof the air becomes laden with moisture and may be delivered to any desired point of application or use through suitable conduits or passages S (see Fig. 3) or otherwise.

If desired, a drip pan or receptacle T may be employed to catch the drippings from the apparatus, and a convenient arrangement is shown wherein the rotary frame revolves partially within the drip-receptacle T, thereby not only aiding in the application of the water to the surface to be saturated, but also serving as a means for washing any deposit or sediment from the interstices of the netting forming the surface to be saturated.

In practice I have found it desirable to distribute the water delivered to the surface to be saturated, as above described, uniformly, and to this end instead of having the delivery-pipes E and K deliver through the perforations G therein directly upon the surface of the netting I arrange said pipes to deliver upon strips of suitable fabric, such as cloth or the like, (indicated at W,) which strips of fabric are arranged to bear upon the surfaces C. In this manner not only is the water-supply to the surfaces C equally distributed thereover, but also during the relative movement of the perforated delivery-pipes and the surface to be saturated the water is spread over the surface of the network and forms films in the interstices of the netting, thus materially aiding in increasing the efficiency of the apparatus.

The operation of an apparatus embodying the principles of my invention is as follows: Rotation is imparted to the fan or blower N from any suitable source, such fan drawing its supply from the outer air or from other suitable source and delivering the blast into the interior of the frame of the apparatus and thence through the netting upon the surface of which the water is being delivered, thereby causing the air to become moisture-laden to the desired degree and from which the moistened air may be delivered to any desired point where it may be utilized for the purposes in view, and while I have shown fan-blades as a means for effecting the rotation or relative movement of the fan which carries the surface to be saturated with reference to the delivery-pipes R, I do not desire my invention limited or restricted thereto, as the desired rotation of the surfaces C may be effected in any other suitable or convenient manner. It is also obvious that many variations and changes in the details of construction and arrangement would readily suggest themselves to persons skilled in the art and still fall within the spirit and scope of my invention. I do not desire, therefore, to be limited or restricted to the exact details shown and described.

It is obvious that the supply of water to the supply-pipes E and K may be controlled in any simple, suitable, or convenient manner.

I have mentioned the application of my invention for use in connection with humidifying the air for auditoriums, hospitals, conservatories, hothouses, and certain lines of manufacture where such regulation is desired; but I do not desire to be limited in respect of the use of my invention.

Having now set forth the object and nature of my invention, what I claim as new and useful and of my own invention, and desire to secure by Letters Patent of the United States, is—

1. In an apparatus for humidifying air, a frame, a perforated surface supported upon said frame, a pipe adapted to communicate with a source of water-supply arranged to deliver the same upon said surface, a fabric arranged to bear upon said surface and adapted to receive the water from said delivery-pipe, said fabric operating to form a water-film over the perforations in said surface, said surface being mounted for movement relative to said pipe and fabric, and a fan-blower for delivering air through said perforations, as and for the purpose set forth.

2. In an apparatus of the class described, a rotary frame, a netting supported upon said frame, a pipe communicating with a source of water-supply and arranged adjacent to the surface of said netting and stationary with respect thereto, a fabric arranged to receive the water from said pipe, said fabric bearing upon the surface of said netting and operating to form a water-film over the interstices of said netting, and means for delivering air into the interior of said frame to pass outwardly through such interstices, as and for the purpose set forth.

In witness whereof I have hereunto set my hand, this 7th day of February, 1901, in the presence of the subscribing witnesses.

LOUIS CARLETON BULKLEY.

Witnesses:
RICHARD O. JONES,
NATHAN FRANK.